United States Patent
Campbell et al.

(10) Patent No.: US 11,067,448 B2
(45) Date of Patent: Jul. 20, 2021

(54) SPECTRAL OBJECT DETECTION

(71) Applicant: Parsons Corporation, Centreville, VA (US)

(72) Inventors: Matthew B. Campbell, Annandale, VA (US); Andrew J. Dally, Lexington, NC (US)

(73) Assignee: PARSONS CORPORATION, Centreville, VA (US)

( * ) Notice: Subject to any disclaimer, the term of this patent is extended or adjusted under 35 U.S.C. 154(b) by 87 days.

(21) Appl. No.: 16/532,071

(22) Filed: Aug. 5, 2019

(65) Prior Publication Data

US 2020/0109990 A1  Apr. 9, 2020

Related U.S. Application Data

(60) Provisional application No. 62/742,007, filed on Oct. 5, 2018.

(51) Int. Cl.
| | | |
|---|---|---|
| *G01J 3/28* | (2006.01) | |
| *G01J 3/10* | (2006.01) | |
| *G01J 3/02* | (2006.01) | |
| *G01J 3/32* | (2006.01) | |

(52) U.S. Cl.
CPC ............. *G01J 3/2823* (2013.01); *G01J 3/027* (2013.01); *G01J 3/0254* (2013.01); *G01J 3/10* (2013.01); *G01J 3/32* (2013.01); *G01J 2003/2826* (2013.01); *G01J 2003/2866* (2013.01); *G01J 2003/323* (2013.01)

(58) Field of Classification Search
CPC .................................................... G01J 3/2823
USPC .......................................................... 356/326
See application file for complete search history.

(56) References Cited

U.S. PATENT DOCUMENTS

| | | | |
|---|---|---|---|
| 5,982,486 A | 11/1999 | Wang | |
| 6,018,587 A | 1/2000 | Cabib | |
| 6,343,141 B1 | 1/2002 | Okada et al. | |
| 6,535,632 B1 | 3/2003 | Park et al. | |
| 6,670,963 B2 | 12/2003 | Osberger | |
| 6,697,502 B2 | 2/2004 | Luo | |
| 6,714,304 B2 | 3/2004 | Ota | |
| 6,897,426 B2 | 5/2005 | Etienne-Cummings et al. | |
| 7,030,991 B1 * | 4/2006 | Kampe | G01J 3/0259 356/399 |

(Continued)

OTHER PUBLICATIONS

Gat, Nahum et al.; "Chemical Detection Using the Airborne Thermal Infrared Imaging Spectrometer (TIRIS)"; DPIE Conerence 3082; Monday Apr. 21, 1997; pp. 1-10.

(Continued)

*Primary Examiner* — Tarifur R Chowdhury
*Assistant Examiner* — Omar H Nixon
(74) *Attorney, Agent, or Firm* — Martensen IP; Michael C. Martensen

(57) ABSTRACT

A multispectral material detection system captures spectral data and compares select spectral bands to reflectance spectra of a plurality of materials. The system identifies distinguishing features in reflectance spectra of a plurality of materials and in a plurality of spectral channels identifying distinguishing structural aspects of each material with respect to the background environments. Upon an observed spectral reflectance being proximate to one or more known spectra characteristics, the object is associated with a material of interest.

17 Claims, 7 Drawing Sheets

(56) References Cited

U.S. PATENT DOCUMENTS

| | | | |
|---|---|---|---|
| 7,869,043 B2 | 1/2011 | Campbell et al. | |
| 8,977,347 B2 | 3/2015 | Mestha et al. | |
| 9,196,056 B2 | 11/2015 | Hall | |
| 9,224,057 B2 | 12/2015 | Bertin | |
| 2002/0044674 A1 | 4/2002 | Pavlidis | |
| 2002/0096622 A1* | 7/2002 | Adler-Golden | G06K 9/0063 250/208.1 |
| 2003/0184748 A1 | 10/2003 | McCarthy | |
| 2005/0275847 A1 | 12/2005 | Moshe | |
| 2006/0173355 A1* | 8/2006 | Alfano | A61B 5/0059 600/476 |
| 2006/0232781 A1 | 10/2006 | Kranz et al. | |
| 2007/0024946 A1 | 2/2007 | Panasyuk et al. | |
| 2007/0146700 A1* | 6/2007 | Kowarz | G01J 3/2823 356/310 |
| 2010/0210931 A1* | 8/2010 | Cuccia | A61B 5/0059 600/328 |
| 2010/0253941 A1* | 10/2010 | Brady | G01J 3/0208 356/310 |
| 2013/0202197 A1* | 8/2013 | Reeler | G06K 9/00201 382/154 |
| 2013/0331669 A1 | 12/2013 | Berte et al. | |
| 2013/0345568 A1 | 12/2013 | Mestha et al. | |
| 2014/0180132 A1 | 6/2014 | Shan et al. | |
| 2014/0185046 A1* | 7/2014 | Urushidani | G01N 21/359 356/402 |
| 2014/0213910 A1* | 7/2014 | Durkin | G06T 7/0012 600/477 |
| 2014/0285798 A1* | 9/2014 | Nishimura | G01N 21/8483 356/300 |
| 2016/0069743 A1* | 3/2016 | McQuilkin | A22B 5/007 356/416 |
| 2016/0097713 A1* | 4/2016 | Kester | G01N 21/3504 356/51 |
| 2016/0205415 A1 | 7/2016 | Kokaram et al. | |
| 2017/0336281 A1* | 11/2017 | Waxman | G01N 21/85 |
| 2018/0137620 A1* | 5/2018 | Gatto | G06K 9/00885 |
| 2019/0145891 A1* | 5/2019 | Waxman | G01J 3/0208 356/409 |

OTHER PUBLICATIONS

Harig, Roland et al.; "Toxic Cloud Imaging by Infrared Spectrometry: A Scanning FTIR System for Identification and Visualization"; 2001; Field Analytical Chemistry and Technology; Hamburg-Ha. Germany.

Hsu, Sherman: "Infrared Spectroscopy": Handbook of Instrumental Techniques for Analytical Chemistry (Frank A. Settle, ed.); Jun. 14, 1997; Chapter 15; Prentice Hall; USA.

Kroutil, Robert et al.; "Emergency Response Chemical Detection Using Passive Infrared Spectroscopy"; SPIE Newsroom; 2006; The Intermation Society for Optical Engineering.

Technical Information SD-12 Characteristics and Use of Infrared Detectors; Hamamatsu Photonics K.K., Solid State; Nov. 2004; pp. 1-43; Japan.

* cited by examiner

SPECTRAL OBJECT DETECTION

RELATED APPLICATION

The present application relates to and claims the benefit of priority to U.S. Provisional Patent Application Ser. No. 62/742,007 filed 5 Oct. 2018 which is hereby incorporated by reference in its entirety for all purposes as if fully set forth herein.

STATEMENT REGARDING FEDERAL SPONSORED RESEARCH OR DEVELOPMENT

The U.S. Government has a paid-up license in this invention and the right in limited circumstances to require the patent owner to license others on reasonable terms as provided for by the terms of N0017317D2003 awarded by the Naval Research Laboratory.

BACKGROUND OF THE INVENTION

Field of the Invention

Embodiments of the present invention relate, in general, to spectral measurements and more particularly to passive detection of objects using spectral measurements.

Relevant Background

There is a constant need, particularly in the military, safety and security fields, for advanced technologies that provide increased situational awareness in a city, municipality or even a combat zone. Accurate information regarding the number and location of humans in a particular area is an essential component of situational awareness. Automatically detecting humans by passively detecting skin would be extremely beneficial to law enforcement personnel, soldiers and security officers. This knowledge would provide an enhanced picture of a particular area of interest or operating environment.

At present, several methods employing video surveillance technology are being developed to detect objects. Typically, these methods exploit either RGB color-matching or spatial object recognition methods to locate humans in a particular scene. Unfortunately, these methods are limited due to a susceptibility to false alarms.

Traditional color visible camera systems and panchromatic near-infrared, short-wave infrared, mid-wave infrared, and long-wave infrared use imprecise spectral information, so the relative brightness in each color channel or infrared band does not provide a differentiator between materials of interest in clutter/background materials.

Other systems, such as those that employ object recognition methods, rely on an ability to associate a shape of an object in a scene with an individual. One limitation associated with this method is that it is necessary for an individual in the scene to span an extended portion of the field-of-view in order to obtain accurate shape identification. In addition, shape matching methods are susceptible to false negatives, such as may occur if shapes found in a scene are not recognized. For example, shape matching methods cannot reliably detect two individuals walking arm-in-arm, or individuals carrying large objects.

It is well known that Hyper Spectral Imaging (HSI), which is defined as many tens or hundreds of narrow spectral bands in either the visible or infrared (IR) portion of the spectrum, is capable of adding significantly to information contained in an image as compared to conventional imaging. In addition, numerous studies and patents have shown that HSI imaging can detect camouflage, crop variations, provide discrimination of various targets, and potentially identify carcinomas. To do so full HSI sensors gather data simultaneously in many HSI bands across multiple spatial dimensions.

Hyperspectral imaging (HSI) systems provide the precise spectral information required to detect and classify materials of interest in cluttered environments, but they do not provide portable form factor of the imaging system described herein and ones that do provide a portable form factor are significantly limited in the spatial resolution information available. As implied above, HSI systems require significant computational processing to identify materials of interest due to the large number of spectral bands under consideration.

Imaging systems that use spatial classifiers are effective when an object of interest is out in the open. But the performance of the approaches is limited when the object of interest is partially occluded. Imaging systems that rely on polarimetric information are designed to find objects that differ from the background. However, they do not have the precision to detect and classify materials based on the molecular makeup of the material. The features exploited by polarimetric imaging systems are typically spatial/geometric features, and therefore are limited in situations when an object of interest is partially occluded.

Radar and Lidar systems rely on geometrically mapping objects in an area, designed to detect the presence of an object. However, the methods are susceptible to limited performance in environments in which the clutter/background has similar spatial/geometric dimensions as the object of interest.

What is needed is a system that exploits the precise wavelength-dependent albedo to detect materials of interest. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A precise multispectral imaging material detection system captures spectral data and compares select spectral precise bands to reflectance spectra of a plurality of materials. In conjunction with a machine capable of executing instructions embodied as software, the system identifies distinguishing features in reflectance spectra of a plurality of materials and in a plurality of spectral channels identifying distinguishing structural aspects of each material with respect to the background environments.

The present invention compares observed spectral reflectance's on a pixel by pixel basis with a predetermined range of know spectra characteristics. Upon an observed spectral reflectance being proximate to one or more known spectra characteristics, the object is associated with a material of interest. The known spectra characteristics are selected from a spectra characteristics datafile and/or data reference possessing a variety of reflectance data for a plurality of materials in various background conditions.

In another instance of the present invention the location of the spectral bands (also referred to herein as a spectral channel), for a particular material of interest, are predetermined, as is the bandwidth of the band. In another embodiment the location and bandwidth of the spectral bands are based on a plurality of observed factors including the background environment, one or more materials of interest, and identified differentiated structure in the material of interest spectra.

A methodology for locating an object in a background environment based on a material of interest, according to one embodiment of the present invention, begins by capturing by a multispectral collection system, spectral data of the object in the background environment in two or more selectable spectral bands, the bands having a select bandwidth. Reflectance spectra characteristics of a plurality of materials of interest in the background environment resident in a data file is retrieved and compared to spectral data captured in the two or more selectable spectral bands. Responsive to the captured spectral data being proximate to one or more of the reflectance spectra characteristics of the plurality of material of interests, the present invention associates an object present in the captured spectral image with a material of interest.

This methodology is applicable to a plurality of background environments in which exploitable structures between the reflectance spectra characteristics of the material of interest and the background environment can account for one or more atmospheric transmission spectra.

The present invention can, in another instance, be implemented through a non-transitory computer-readable storage medium tangibly embodying a program of instructions executable by a machine wherein said program of instruction comprises a plurality of program codes for locating an object in a background environment. In such a case, the program of instruction includes program code for capturing by a multispectral collection system spectral data of the object in the background environment in two or more selectable spectral bands and compares the captured spectral data to the reflectance spectra characteristics of the plurality of material of interests. The instructions thereafter direct the machines, responsive to the captured spectral data being proximate to one or more of the reflectance spectra characteristics of the plurality of material of interests, to associate the object with a material of interest.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
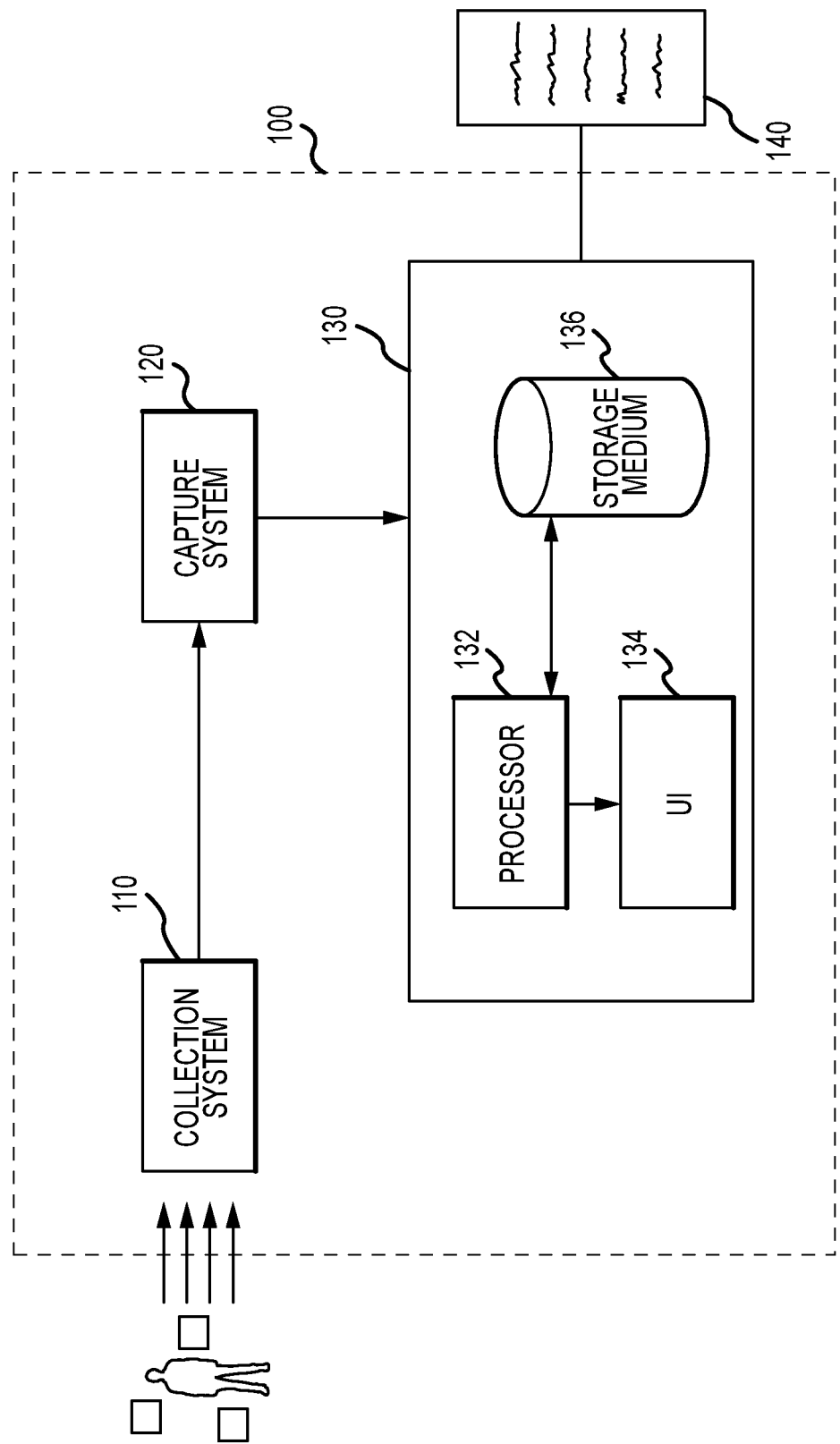
FIG. 1 presents a high-level system architecture for a spectral object detection system, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

The present invention comprises a multi-object spectral detection system, and associated methodology, that ingests data from a camera and performs image processing analytics to identify the presence of a material of interest. An imaging system (also referred to herein as a collection system) gathers data in a small number of precise (typically under 40 nanometers full-width at half-maximum although one of reasonable skill in the relevant art will appreciate the bandwidth of the spectral channels may vary depending on an application and various bandwidths both under and above 40 nanometers are equally applicable to the present invention and are indeed contemplated) spectral channels throughout a predefined range of the electromagnetic spectrum. In one version of the present invention, optical (or equivalent) components direct incoming light (signals) onto a sensor array which measures the brightness level in each of a plurality of select spectral channels creating a spectral image. Within each spectral image are a plurality of pixels and each pixel includes a brightness value corresponding to each spectral channel of the collection system.

Recognizing that different materials exhibit different degrees of reflectance (brightness) under certain background conditions and in various spectral channels, the present invention compares observed brightness values in select spectral channels of each pixel to predetermined reflectance characteristics for one or more materials of choice. Responsive to the observed brightness values being proximate to one or more of the predetermined reflectance characteristics the present invention associates a material of interest with a particular pixel of an object.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined herein, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

For the purpose of the present invention the following terms are to be understood to mean:

Multispectral Image—A multispectral image is one that captures image data within specific wavelength ranges across the electromagnetic spectrum. The wavelengths may be separated by filters or by the use of instruments that are sensitive to particular wavelengths, including light from frequencies beyond the visible light range, i.e. infrared and ultra-violet. Spectral imaging can allow extraction of additional information the human eye fails to capture with its receptors for red, green and blue. It was originally developed for space-based imaging and has also found use in document and painting analysis. Multispectral imaging measures light in a small number of spectral bands. Hyperspectral imaging is a special case of spectral imaging where often hundreds of contiguous spectral bands are available.

Wavelengths for various spectra include:
Blue, 450-515 . . . 520 nm, is typically used for atmosphere and deep water imaging, and can reach depths up to 150 feet (50 m) in clear water.
Green, 515 . . . 520-590 . . . 600 nm, is typically used for imaging vegetation and deep water structures, up to 90 feet (30 m) in clear water.
Red, 600 . . . 630-680 . . . 690 nm, is typically used for imaging man-made objects, in water up to 30 feet (9 m) deep, soil, and vegetation.
Near infrared (NIR), 750-1400 nm, is typically used primarily for imaging vegetation.
Short-Wavelength Infrared (SWIR), 1400-3000 nm. Water absorption increases significantly at 1450 nm. The 1530 to 1560 nm range is the dominant spectral region for long-distance telecommunications.

Mid-Wavelength Infrared (MWIR), 3000-8000 nm, can be used for imaging vegetation, soil moisture content, and some forest fires. This region is also known as thermal infrared. In guided missile technology the 3-5 μm portion of this band is the atmospheric window in which the homing heads of passive IR 'heat seeking' missiles are designed to work, homing on to the Infrared signature of the target aircraft, typically the jet engine exhaust plume.

Long-Wavelength Infrared (LFIR), 8000-15000 nm, The 'thermal imaging' region, in which sensors can obtain a completely passive image of objects only slightly higher in temperature than room temperature—for example, the human body—based on thermal emissions only and requiring no illumination such as the sun, moon, or infrared illuminator.

Thermal infrared, (a subset of LFIR) 10400-12500 nm, uses emitted instead of reflected radiation to image geological structures, thermal differences in water currents, fires, and for night studies.

Radar and related technologies are useful for mapping terrain and for detecting various objects.

Hyperspectral Imaging—Hyperspectral imaging, like other spectral imaging, collects and processes information from across the electromagnetic spectrum. The goal of hyperspectral imaging is to obtain the spectrum for each pixel in the image of a scene, with the purpose of finding objects, identifying materials, or detecting processes. There are two general branches of spectral imagers. There are push broom scanners and the related whisk broom scanners, which read images over time, and snapshot hyperspectral imaging, which uses a staring array to generate an image in an instant.

Whereas the human eye sees color of visible light in mostly three bands (long wavelengths—perceived as red, medium wavelengths—perceived as green, and short wavelengths—perceived as blue), spectral imaging divides the spectrum into many more bands. This technique of dividing images into bands can be extended beyond the visible. In hyperspectral imaging, the recorded spectra have fine wavelength resolution and cover a wide range of wavelengths. Hyperspectral imaging measures continuous spectral bands, as opposed to multispectral imaging which measures spaced spectral bands. Hyperspectral sensors look at objects using a vast portion of the electromagnetic spectrum. Certain objects leave unique 'fingerprints' in the electromagnetic spectrum. Known as spectral signatures, these 'fingerprints' enable identification of the materials that make up a scanned object. For example, a spectral signature for oil helps geologists find new oil fields. For the purpose of the present invention, multi-spectral imaging targets a subset/fingerprint of information available from a hyperspectral camera, without superfluously collecting/processing all the other spectral data that is inconsequential to the fingerprint.

Pixel—A pixel, in digital imaging, is a physical point in an image, or the smallest addressable element in an all points addressable display device; so, it is the smallest controllable element of a picture represented on the screen. Each pixel represents an area on an image that is a measure of the sensor's ability to resolve (see) objects of different sizes. For example, the Enhanced Thematic Mapper (ETM+) on the Landsat 7 satellite has a maximum resolution of 15 meters; therefore, each pixel represents an area 15 m×15 m, or 225 m². Higher resolution (smaller pixel area) means that the sensor is able to discern smaller objects. By adding up the number of pixels in an image, you can calculate the area of a scene.

Electromagnetic Spectrum—The entire array of electromagnetic waves comprises the electromagnetic (EM) spectrum. The waves are called electromagnetic because they consist of combined electric and magnetic waves that result when a charged particle (electron) accelerates. The EM spectrum has been arbitrarily divided into regions or intervals to which descriptive names have been applied. At the very energetic (high frequency; short wavelength) end are gamma rays and x-rays. Radiation in the ultraviolet region extends from about 1 nanometer to about 0.36 micrometers. It is convenient to measure the mid-regions of the spectrum in these two units: micrometers (μm), a unit of length equivalent to one-millionth of a meter, or nanometers (nm), a unit of length equivalent to one-billionth of a meter. The visible region occupies the range between 0.4 and 0.7 μm, or its equivalents of 400 to 700 nm. The infrared (IR) region, spans between 0.7 and 100 μm.

Albedo—Albedo is the measure of the diffuse reflection of solar radiation out of the total radiation received by an astronomical body (e.g. a planet like Earth). It is dimensionless and measured on a scale from 0 (corresponding to a black body that absorbs all incident radiation) to 1 (corresponding to a body that reflects all incident radiation. Simply put, Albedo is the proportion of the incident light or radiation reflected by a surface.

A multi-object spectral detection system collects data and conducts image processing analytics to identify the presence of a material of interest. According to one embodiment of the present invention an collection system gathers data in a small number of precise (typically under 40 nanometers full-width at half-maximum) spectral channels throughout a predefined range of the electromagnetic spectrum. Optical (or equivalent) components direct incoming light (signals) onto a sensor array which measures the brightness (reflectance) level in each of a plurality of select spectral channels creating a spectral image. Within each spectral image are a plurality of pixels and each pixel includes a brightness value corresponding to each spectral channel of the collection system.

The detection system thereafter compares observed brightness values in select spectral channels to predetermined reflectance characteristics for one or more materials of choice. Responsive to the observed brightness values being proximate to one or more of the predetermined reflectance characteristics the present invention associates a material of interest with a particular pixel of an object.

FIG. 1 presents a high-level system architecture for the multi-object spectral detection system 100 of the present invention. A collection system 110, such as a multispectral device or one or more other sensors, captures image data within specific wavelength ranges across the electromagnetic spectrum. The wavelengths may be separated by a plurality of filters or through the use of instruments that are sensitive to particular wavelengths, including light from frequencies beyond the visible light range, i.e. infrared and ultra-violet. Spectral imaging allows extraction of additional information the human eye fails to capture with its receptors for red, green and blue.

Each pixel of an image gained from the collection system 110 contains spectral information, which is added as a third dimension of values to the two-dimensional spatial image, generating a three-dimensional data stack. A simple, well-known example of a three-dimensional data stack is the common RGB color image, where each pixel has red, green, and blue color. A capture system 120, communicatively coupled to the collections system 110, identifies spectral data such as absorption, reflectance, or fluorescence for each image pixel. Unlike the example above, spectral range in multi spectral data can extend beyond the visible range (ultraviolet, infrared). Multispectral imaging sometimes refers to imaging that using two or more different spectroscopy methods in the imaging mode simultaneously (e.g., wavelength and fluorescence).

In one embodiment, the collection system is a sensor array that creates a spectral image comprising a stack of two-dimensional grayscale images. Each grayscale image of the stack corresponds to one of a plurality of spectral channels. The collection system 110 registers each grayscale image to ensure pixels in each grayscale image corresponds to the same location in the collection system's field of view. Each pixel in the spectral image contains brightness values corresponding to each spectral channel of the collection system 110. In another embodiment the sensors can be a Bayer-type sensor wherein each pixel does not directly measure all the spectral bands but brightness values can be calculated for all pixels in all bands via interpolation. In yet another embodiment the registration of each grayscale image is performed by the capture system 120 or spectral engine 130.

A capture system 120, communicatively coupled to the collection system 110, performs analytics on the information captured in each spectral image collected by the collection system 110. The analytics exploit the albedo in each spectral channel of the collection system of the objects of interest to identify pixels in the image that correspond to a material of interest. Pixels and/or groups of pixels that correspond to a material of interest are identified by the collection system 110.

The multi-object spectral detection system 100 of the present invention further includes a spectral engine 130 having, among other things, a processor 132, user interface 134, and a non-transitory storage media 136. Along with instructions embodied as code, the non-transitory storage media 136 includes, in one embodiment, a reflectance spectra characteristics datafile of a plurality of materials. In one instance of the present invention, the spectral engine, based on a desired detection of a material of interest, identifies select spectral channels for examination. Using information gained by the collection system 110 and the capture system 120 with respect to each pixel and data contained in the reflectance spectra characteristics datafile, the spectral engine 130 determines a degree of confidence whether or not the select material is or is not present. Based on data gained through the collection and capture system and this analysis, the present invention provides the user, via a user interface 134, a report 140 indicating the presence of a select material of interest and its particular location. In capturing, and analyzing, spectral data the present invention can identify whether or not a material of interest is present in the captured scene.

Figure 2:
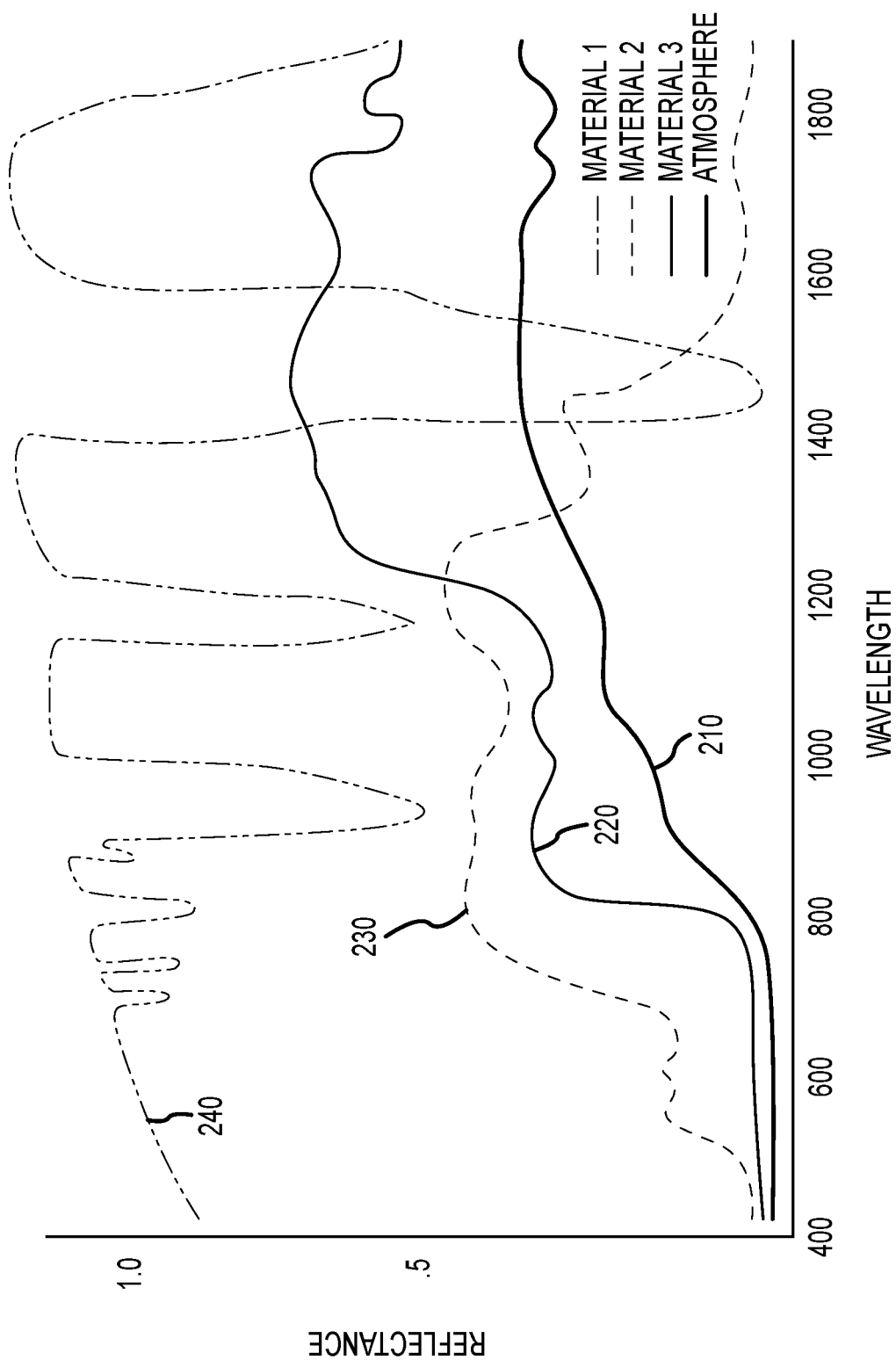
FIG. 2 is a graphic depiction of reflectance indicia versus wavelength for a plurality of material along with atmospheric absorption rates, according to one embodiment of the present invention.

FIG. 2 is a graphic depiction of reflectance indicia versus wavelength for a plurality of material along with atmospheric absorption rates, according to one embodiment of the present invention. One of reasonable skill in the relevant art will appreciate that different material has differing degrees of reflectance. One only needs to compare the reflectivity of a piece of concrete to that of a wool coat to recognize that material has a significant impact on reflectance characteristics. And certainly, the background in which a particular material is viewed is also important. Consider for example the light environment of a smooth body of water, compared to a to a forested landscape as opposed to a cloudy sky. Each are unique. Similarly, the same material may present differing reflectance characteristics in one environment as opposed to another. The present invent recognizes and takes advantage of these distinctions.

FIG. 2 presents several examples of reflectance (brightness) over a wide range of wavelength. In this example, three materials, material 1 210, material 2 220 and material 3 230, are presented as compared to a particular instance of background illumination.

As shown, each material, in this particular atmospheric condition 240, presents a unique reflectance signature. The present invention captures unique qualities of a material's reflectance signature and uses it to identify the presence of that material in an image.

Figure 3:
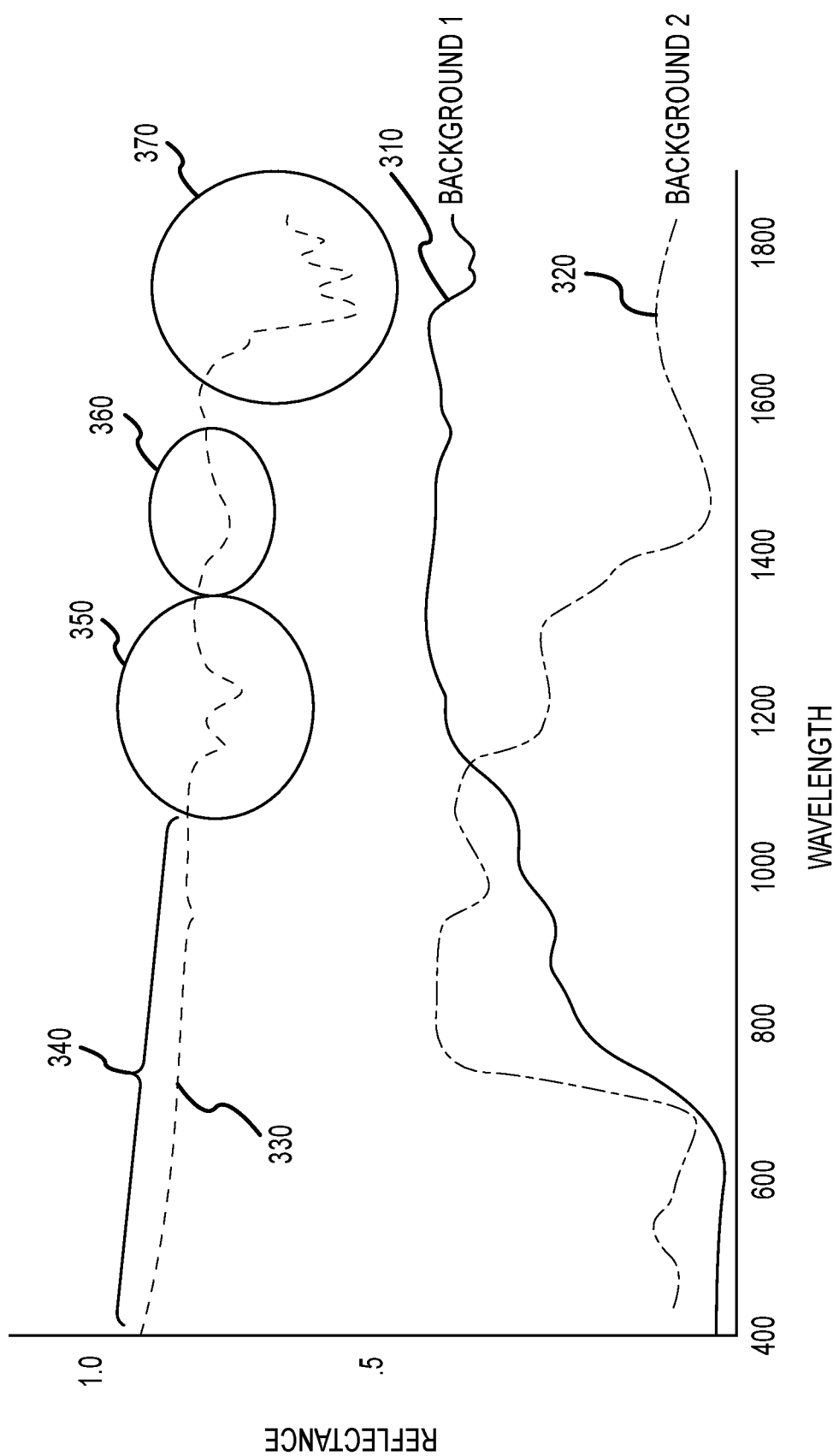
FIG. 3 is a graphic depiction of reflectance indicia identifying exploitable structure in a reflectance spectrum for a material of interest, according to one embodiment of the present invention.

One embodiment of the present invention exploits structure in the reflectance spectrum of a material, independent of the background and/or atmospheric conditions. FIG. 3 is a graphic depiction of reflectance indicia identifying exploitable structure in a reflectance spectrum for a material of interest, according to one embodiment of the present invention. FIG. 3 presents a reflectance indicia 330 with respect to two different background condition 310, 320 and a single material of interest. In the leftmost portion 340 of FIG. 3, the reflectance structure of this particular material is flat, that is, consistent. For example, consider that the reflectance of background 1 310 differs significantly from the reflectance of background 2 320 from 600 to 900 nm. However, over the same interval the reflectance indicia 330 of this material of interest is consistent.

As the structure in the reflectance spectrum of the material of interest is observed over longer wavelengths, deviations in the structure is noticed. In the first exploitable region 350, two significant deviations are recognized between 1100 nm to 1300 nm. In the same region the observed reflectance indicia of background 2 320 drops significantly, and thereafter incurs two inflection points. Similarly, over the same period, background 1 310 demonstrates a change in its reflectance indicia. While the changes in the structure of the reflectance of the material of interest may be associated with either background environments, it is apparent that over this region of the spectrum these changes can be exploited.

In the second exploitable region 360 the structure deviation corresponds to a significant change in reflectance indicia noticed in background environment 2 320. During the same region changes in the observed reflectance of background 1 310 are minimal, leading to a conclusion that observing changes in reflectance in spectral bands from 1300 nm to 1500 nm in a background environment similar to background 2 320 can be exploited.

Lastly the third region 370, from 1550 nm to 1800 nm shows significant changes in the structure in the reflectance of the material of interest. In this case the reflectance of background 2 320 shows minimal modifications, while reflectance indicia of background 1 310 demonstrate significant perturbations. Accordingly, in a background 1 310 environment, observing changes in reflectance of spectral channels in the region can be exploited.

One of reasonable skill in the relevant art will appreciate that the identified differentiated structure of a material of interest may vary from background to background. However, in examining the reflectance of a material of interest over a plurality of background differentiated structures can be found for such a material of interest that are independent of background and atmospheric conditions. Turning back to FIG. 3, while region 2 360 and region 3 370 both show significant deviations in the material of interest's reflectance, the changes are arguably associated with deviations is a single environment. Yet in region 1 350, the structure of reflectance deviations, or at least the presence of deviations over this select section of wavelength, appears independent of the background environment.

FIG. 3 illustrates deviations in reflectance structure of a material of interest with respect to two background environments. One of reasonable skill in the relevant art will appreciate by expanding such an investigation an exploitable differentiated structure can be identified for a plurality of materials of interest.

Figure 4:
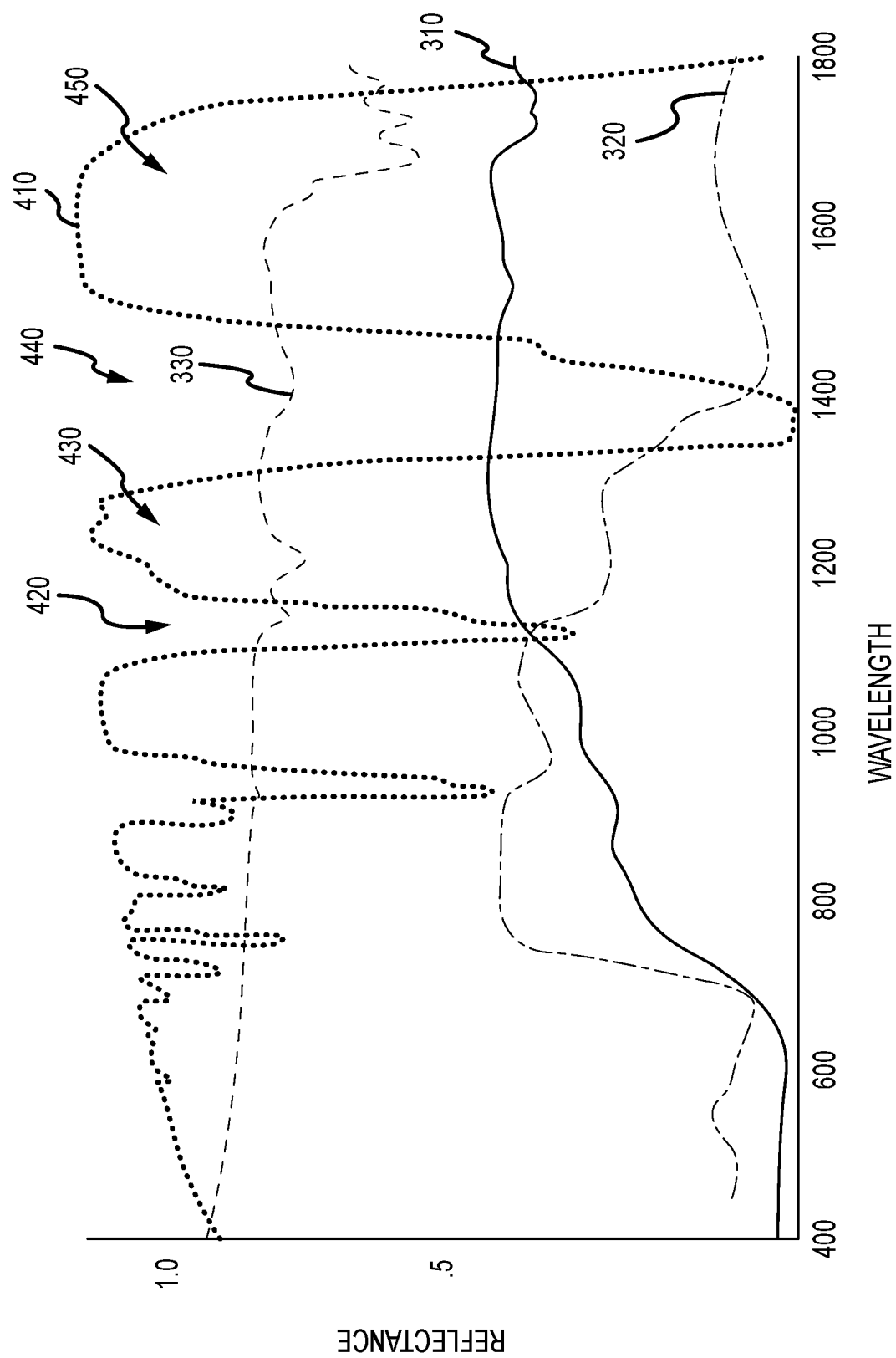
FIG. 4 is a graphic depiction of reflectance indicia contrasting exploitable structure in a reflectance spectrum for a material of interest with atmospheric absorption rates, according to one embodiment of the present invention.

While identifying whether exploitable differentiated structures exists significant, the present invention then considers the impact of atmospheric absorption. FIG. 4 is a graphic depiction of reflectance indicia contrasting exploitable structure in a reflectance spectrum for a material of interest with atmospheric absorption rates.

Some types of electromagnetic radiation easily pass through the atmosphere, while other types do not. The ability of the atmosphere to allow radiation to pass through it is referred to as its transmissivity and varies with the wavelength/type of the radiation. The gases that comprise our atmosphere absorb radiation in certain wavelengths while allowing radiation with differing wavelengths to pass through. The areas of the electromagnetic spectrum that are absorbed by atmospheric gases such as water vapor, carbon dioxide, and ozone are known as absorption bands. Absorption bands are represented by a low transmission value that is associated with a specific range of wavelengths. In contrast to the absorption bands, there are areas of the electromagnetic spectrum where the atmosphere is transparent (little or no absorption of radiation) to specific wavelengths. These wavelength bands are known as atmospheric "windows" since they allow the radiation to easily pass through the atmosphere to Earth's surface.

FIG. 4 overlays atmospheric EM absorption indicia 410 with the identified exploitable structures 350, 360, 370 of FIG. 3. The graph identifies several windows through which EM radiation can easily pass as does it show several opaque regions in which the EM spectrum is absorbed. Referring back to FIG. 3 in addition with FIG. 4, portions of exploitable region 1 350 lie in an area of atmospheric absorption 420 while a later portion of the same region 1 fall in a window 430. The vast majority of region 2 360 lies in an opaque region 440 of the EM spectrum due to atmospheric absorption. Lastly region 3 370, although somewhat inconsistent as to exploitable structure, falls within a window 450 in which absorption would not preclude gather spectral data.

Figure 5:
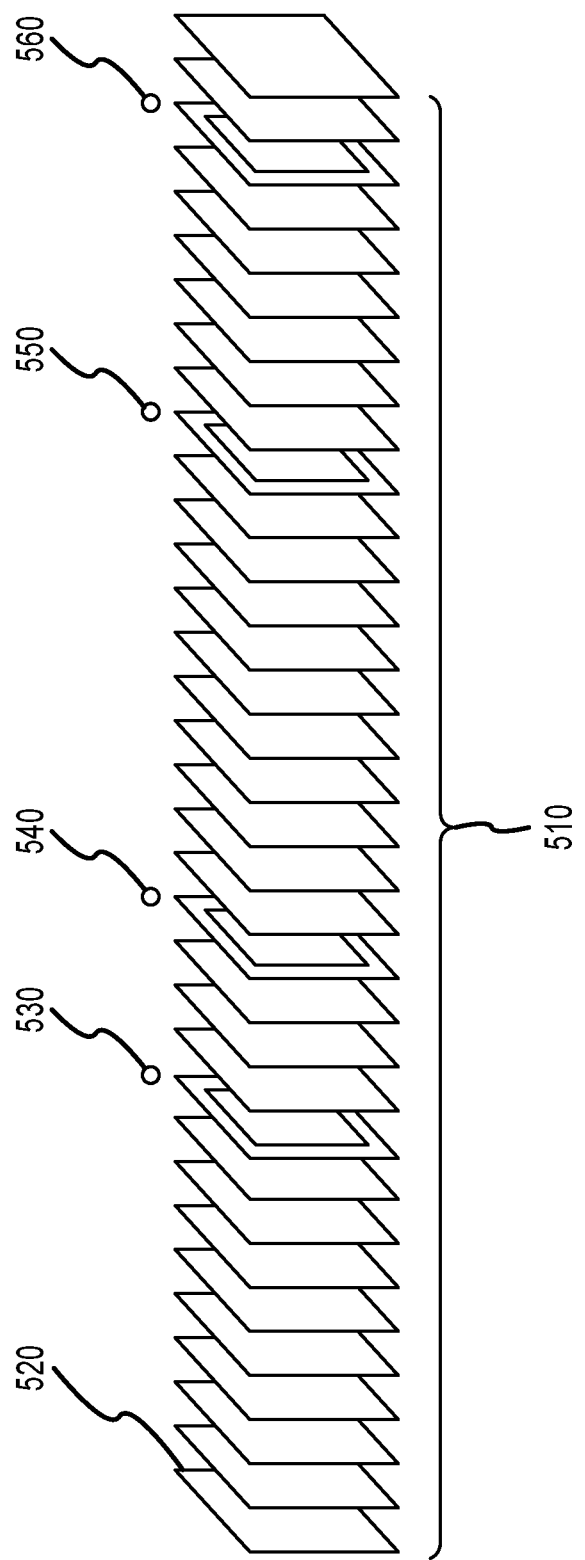
FIG. 5 is an abstract depiction of a plurality spectral channels of an image as utilized in one or more embodiments of the present invention.

One aspect of the present invention is the selection of spectral bands for collection and analysis of spectral data. As illustrated in FIG. 5, each spectral image can be divided into a plurality of spectral bands or spectral channels. Determining the width of the channel and its location within the electromagnetic spectrum is, according to the present invention, based on exploitable differentiated structures in reflectance in consideration of atmospheric absorption and/or lighting conditions of environment in which the invention will be used.

Figure 6:
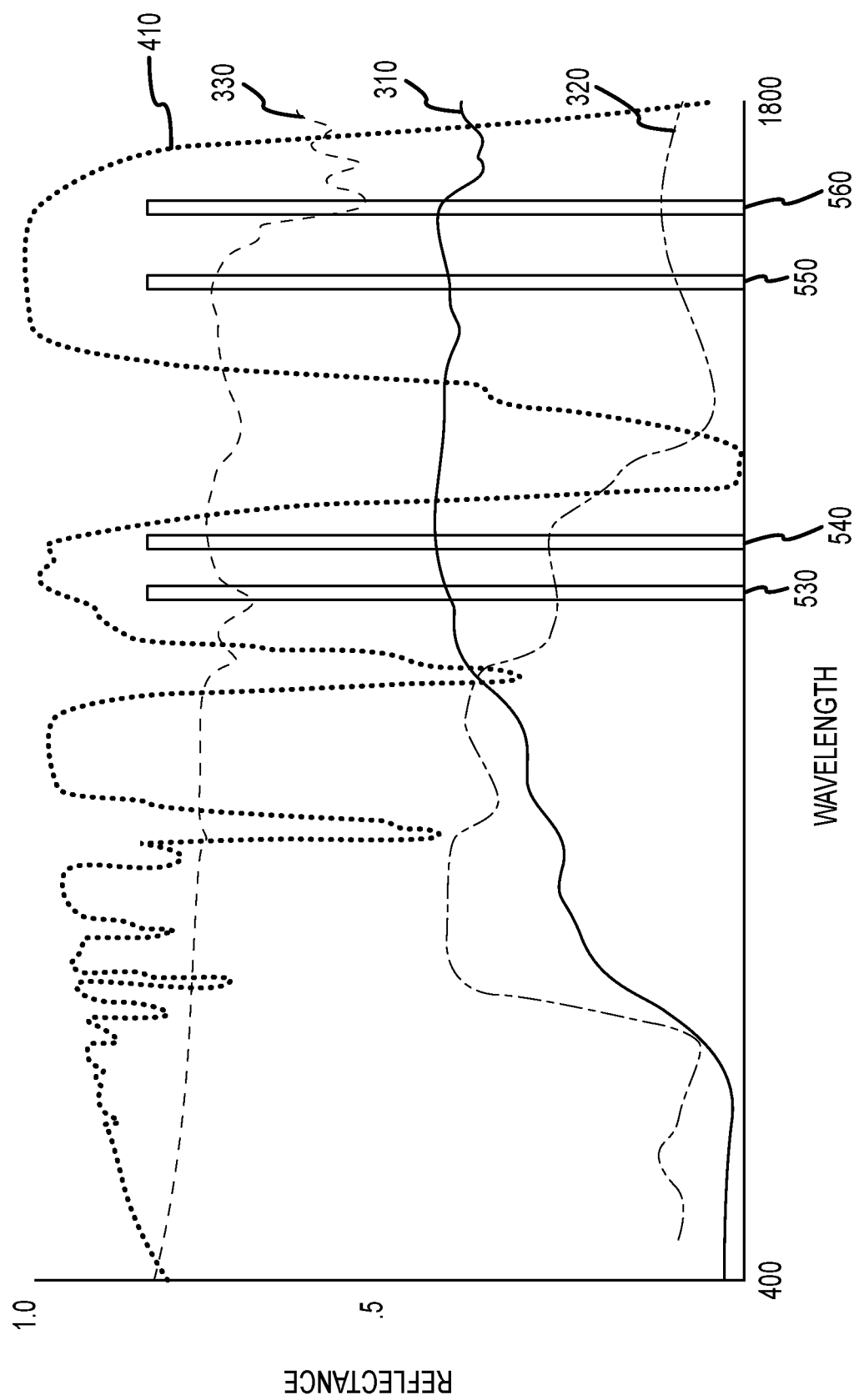
FIG. 6 is an overlay of select spectral channels of a material of interest on the graphic depiction of reflectance indicia and exploitable structure in reflectance spectrum for the material of interest, according to one embodiment of the present invention.

FIG. 5 abstractly identifies a plurality of spectral channels 510 of the same image 520. Of these channels, four 530, 540, 550, 560 are relevant for analysis to determine is a material of interest is present. With additional reference to FIG. 6, one or reasonable skill in the relevant art can appreciate the placement and width of these select spectral channel. As shown in both FIG. 5 and FIG. 6, four spectral channels 530, 540, 550, 560 of a common image 520 are located within one or more windows 430, 450 of atmospheric absorption. The location and/or size of the spectral channels are selected based on exploitable structures a particular material of interest's reflectance spectra. In this case channels 1 530 and 2 540 are located in exploitable region 1 350 while channels 3 550 and 4 560 are located in exploitable region 3 370.

It will be appreciated by one of reasonable skill in the relevant art that the fundamental process illustrated above can be carried out for a plurality of materials over a wide variety of background and environmental conditions. For each pixel in a captured image spectral data can be sliced into a plurality of channels or bands. And for each pixel an analysis can be conducted as for the presence of a select material of interest.

Moreover, for certain applications of a known environment or in which detection of certain materials is important, sensors can be optimized to collect spectral channels associated with those bands corresponding to an exploitable structure. In doing so the spectral capture system can be optimized and more efficiently employed. Alternatively, a device having the ability to capture a wide range of spectral data can be manipulated to form spectral channel of a predetermined bandwidth at select location to collect data in the determination of whether a material of interest is present.

Consider the following example as an illustration of the present invention. Assume a multi-spectral collection system located on a coastal region can gather images of a field of interest. In this instance the collection system is directed at a popular beach used for surfing and similar water sports. As the water is cold, the vast majority of individuals enjoying the surf wear wetsuits, primarily composed of neoprene. The collection system of this example is positioned at a lifeguard station directed toward the water and has thousands of pixels with a resolution capability of 1 pixel equating to 1 square inch at 1 mile and can cover a 90 degree field of view. Thus, a single image captures a large portion of the beach and near water environment.

On a popular day the beach may attract 2-3 thousand water enthusiasts of which a few hundred don a wetsuit and venture into the surf. Given the water conditions and other events that may transpire on the beach, it is a challenge for the lifeguarding staff to remain aware and monitor the wellbeing of those in the water. The present invention can capture at an instant in time data which can assist the user, the life guard in this case, in identifying swimmers in distress.

Each image includes thousands of pixels. Each pixel is associated with a location on the focal plane of the collection system and each pixel can include spectral data. Assume the user seeks to know where an image are instances of neoprene. That is to say, where in the image are the surfers located. Knowing the exploitable structure of neoprene is a coastal environment the present invention identifies and selects spectral channels in each pixel for analysis. Comparing the collected spectral data with that of the known reflectance of neoprene the present invention can determine, for that pixel, whether neoprene is present.

Knowing the position of the collection system and the location of the pixel within the image, the location of the neoprene (surfer) can be plotted on a user interface. As the images are not static, the present invention can provide historical plots and trends including areas in which a rip tide or other dangerous conditions may exist. In a search or rescue environment the collection system can scan a vast environment and identify the material of interest within a single image enabling rescue personnel to quickly come to the aid of a distressed individual.

In an environment such as this beach example, the collection and capture system can be optimized by including in a storage media reflectance spectra characteristic of select material such as neoprene and other material that may be common to this type of environment. With an understanding of any exploitable structure in the reflectance of select material of interest the location and width of two or more spectral bands can be selected. Indeed, the image collection system can be optimized to capture data within these predetermined and select spectral bands rather than being generalized for data capture across the entire electromagnetic spectrum.

Figure 7:
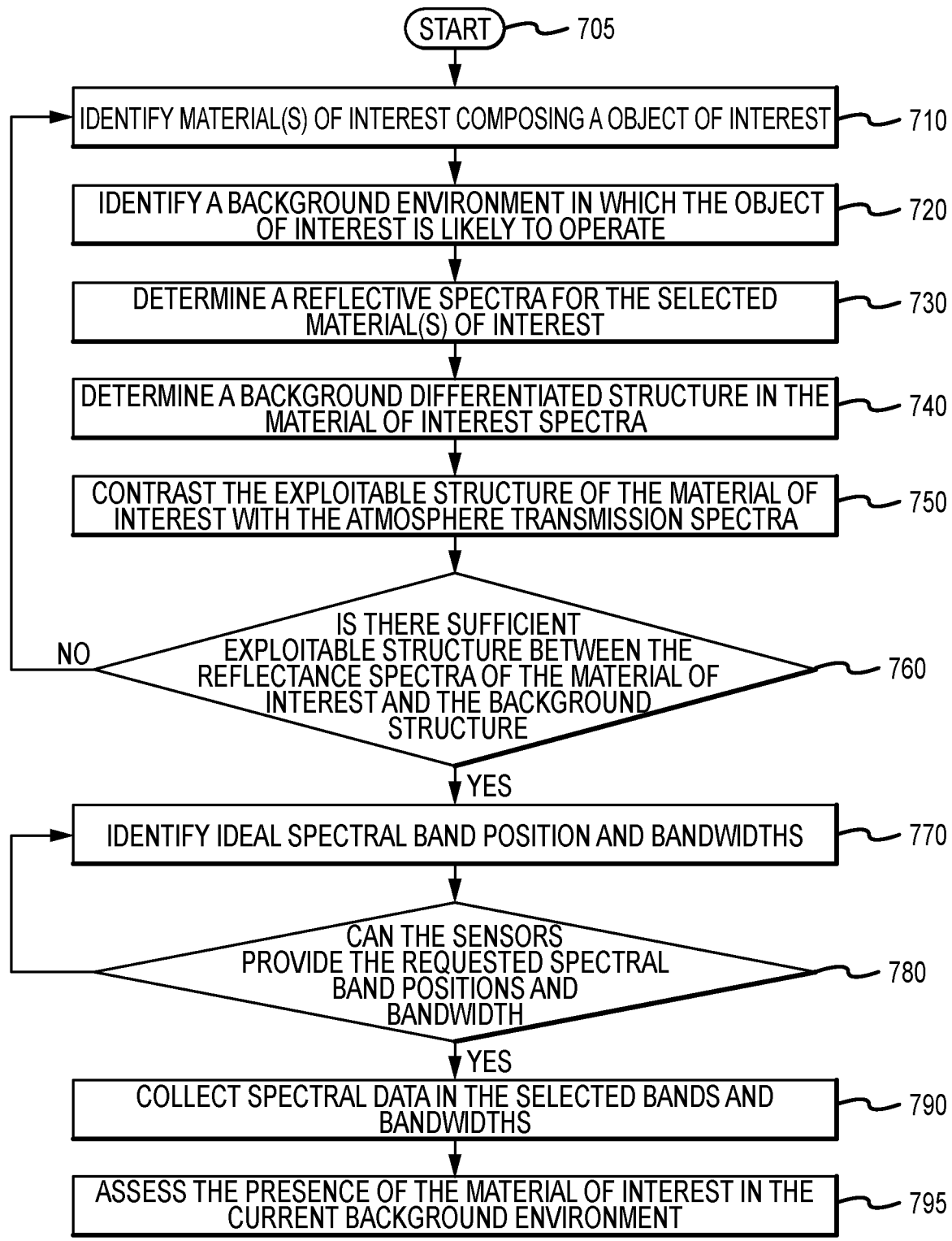
FIG. 7 represents a flowchart for one methodology for spectral identification of a material of interest, according to one embodiment of the present invention.

FIG. 7 is a flowchart for a methodology by which to detect and classify spectral imagery according to one embodiment of the present invention. In the following description, it will be understood that each block of the flowchart illustrations, and combinations of blocks in the flowchart illustrations, can be implemented by computer program instructions, firmware, hardware or a combination of a computer program, firmware and hardware. Computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Detecting a material of interest using spectral information begins 705 with identifying 710 the material of interest and measuring its reflectance spectra characteristics in a variety of background environments. In one embodiment of the present invention the reflectance spectrum of a material of interest is measured using a linear point spectrometer measuring reflectance over a wavelength range of 400 nm and 2.5 microns.

As previously discussed, the background in which the image is being captured is anticipated 720 and the reflectance spectrum of materials typically found in background environment is identified 730. In the beach example illustrated above the combination of sand and water provide a unique reflectance spectrum, significantly different than a desert or forested environment. The reflectance spectra of the material of interest is analyzed with respect to anticipated background environments to identify differentiated structure 740 in spectra between material of interest and the background/clutter materials. The analysis reveals structure in the measured spectra when the reflectance (albedo) of a material changes over a relatively short wavelength range, going from low-to-high, or high-to-low. The regions of the wavelength based albedo that demonstrate high contrast over a restricted wavelength range create a material's exploitable fingerprint. These fingerprints of differentiated structure are contrasted 750 with the atmospheric transmission spectra to identify risks of limited operational performance due to atmospheric effects.

Differentiated structures that exist in atmospheric windows are considered 760 and using this information the present invention identifies ideal spectral band (channel) positions 770 for data collection. These precise spectral channels exploit the spectral fingerprint of the material of interest and are not occluded by atmospheric absorption.

Having identified the location and width of spectral channels needed for the identification of a material of interest is one or more background environments, viability of current sensor (collection system) technology must be assessed 780. In some instances, specialized collecting systems may be designed and fabricated with the required spectral response to enable material detection described herein in relevant environments. In other instances, collections systems sufficient to gather spectral data within identified spectral channels in relevant background environs may exist and can be used.

With a collection system capable of capturing spectral data in select spectral channels, spectral data relevant to a material of interest is gained 790 and analyzed to assess 795 its presence in the relevant background environment.

The present invention exploits the precise wavelength-dependent albedo to detect materials of interest. The albedo is dependent on the molecular makeup of the material of interest and provides a high-confidence discriminator between materials of interest and background and/or clutter items in a collection systems field of view. The present invention uses precise spectral information, not spatial information, to perform detection and classification of materials of interest. Therefore, the detection system of the present invention is able to classify a material of interest at the pixel level.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, portions of the present invention can be implemented in software. Software programming code which embodies the present invention is typically accessed by a microprocessor from long-term, persistent storage media of some type, such as a flash drive or hard drive. The techniques and methods for embodying software programming code in memory, on physical media, and/or distributing software code via networks are well known and will not be further discussed herein.

An exemplary system for implementing the invention includes a general purpose computing device such as the form of a processing unit, a system memory, and a system bus that couples various system components, including the system memory to the processing unit. The system bus may be any of several types of bus structures including a memory bus or memory controller, a peripheral bus, and a local bus using any of a variety of bus architectures. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the computer.

While there have been described above the principles of the present invention in conjunction with multi-object spectral detection system, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A spectral detection system, comprising:
a multispectral image collection system wherein the multispectral image collection system uses a shared optic configured to form a single image having a plurality of pixels;
a reflectance spectra datafile including a plurality of reflectance spectra characteristics of a plurality of materials of interest, each in a plurality of background environments, wherein the plurality of reflectance spectra characteristics account for atmospheric considerations;
a machine capable of executing instructions embodied as software; and
a plurality of software portions resident on a non-transitory storage media, wherein
one of said software portions is configured to capture spectral data of an object in a background environment in two or more selectable spectral bands and to identify spectra characteristics including absorption, reflectance and fluorescence for each pixel in the single image and wherein each selectable band is of a selectable bandwidth, and
one of said software portions is configured to compare spectral data of the object in the two or more selectable spectral bands with reflectance spectra characteristics of the plurality of material of interests from a reflectance spectra datafile.

2. The spectral detection system of claim 1, wherein responsive to spectral data of the object being proximate to one or more of the reflectance spectra characteristics, associating the object with a material of interest.

3. The spectral detection system of claim 2, wherein reflectance spectra of the material of interest selectable from the reflectance spectra datafile is associated with a specific background environment.

4. The spectral detection system of claim 1, wherein the shared optic projects imagery through one or more filters onto one or more sensors to create the single image.

5. The spectral detection system of claim 4, wherein each selectable bandwidth of the two or more selectable spectral bands is present within each pixel of the single image.

6. The spectral detection system of claim 1, wherein location of the two or more selectable spectral bands are based on a select material of interest.

7. The spectral detection system of claim 6, wherein each selectable bandwidth of the two or more selectable spectral bands is based on the select material of interest.

8. A method for locating an object in a background environment based on a material of interest, comprising:
capturing by a multispectral image collection system using a shared optic to form a single image having a plurality of pixels, spectral data of the object in the background environment in two or more selectable spectral bands, wherein each selectable band is of a selectable bandwidth;
retrieving, from a reflectance spectra datafile, reflectance spectra characteristics of a plurality of materials of interest in the background environment wherein the each reflectance spectra characteristic accounts for atmospheric considerations;
identifying spectra characteristics including absorption, reflectance and fluorescence for each pixel in the single image;
comparing captured spectral data in the two or more selectable spectral bands to the reflectance spectra characteristics of the plurality of material of interests; and
responsive to the captured spectral data being proximate to one or more of the reflectance spectra characteristics of the plurality of material of interests, associating the object with a material of interest.

9. The method for locating an object in a background environment based on a material of interest according to claim 8, wherein the plurality of reflectance spectra characteristics of the plurality of materials of interest is each associated with a plurality of background environments.

10. The method for locating an object in a background environment based on a material of interest according to claim 8, further comprising contrasting one or more exploitable structures of the materials of interest with the atmospheric transmission spectra.

11. The method for locating an object in a background environment based on a material of interest according to claim 8, further comprising determining whether there is exploitable structure between the reflectance spectra characteristics of the material of interest and the background environment.

12. The method for locating an object in a background environment based on a material of interest according to claim 8, further comprising selecting ideal positions of the two or more selectable spectral bands and ideal widths of the selectable bandwidth.

13. A non-transitory computer-readable storage medium tangibly embodying a program of instructions executable by a machine wherein said program of instruction comprises a plurality of program codes for locating an object in a background environment; said program of instruction comprising:

program code for capturing by a multispectral image collection system using a shared optic to form a single image having a plurality of pixels, spectral data of the object in the background environment in two or more selectable spectral bands, wherein each selectable band is of a selectable bandwidth;

program code for retrieving, from a reflectance spectra datafile, reflectance spectra characteristics of a plurality of materials of interest in the background environment wherein the each reflectance spectra characteristic accounts for atmospheric considerations;

program code for identifying spectra characteristics including absorption, reflectance and fluorescence for each pixel in the single image;

program code for comparing captured spectral data in the two or more selectable spectral bands to the reflectance spectra characteristics of the plurality of material of interests; and program code responsive to the captured spectral data being proximate to one or more of the reflectance spectra characteristics of the plurality of material of interests, for associating the object with a material of interest.

14. The non-transitory computer-readable storage medium of claim 13 further comprising program code for contrasting one or more exploitable structures of the materials of interest with the atmospheric transmission spectra.

15. The non-transitory computer-readable storage medium of claim 13 wherein the plurality of reflectance spectra characteristics of the plurality of materials of interest is each associated with a plurality of background environments.

16. The non-transitory computer-readable storage medium of claim 13 further comprising program code for determining whether there is exploitable structure between the reflectance spectra characteristics of the material of interest and the background environment.

17. The non-transitory computer-readable storage medium of claim 13 further comprising program code for selecting ideal positions of the two or more selectable spectral bands and ideal widths of the selectable bandwidth.

* * * * *